United States Patent
Skillermark et al.

(10) Patent No.: US 10,512,084 B2
(45) Date of Patent: Dec. 17, 2019

(54) MASTER NODE AND A METHOD THEREIN FOR HANDLING CONNECTIONS TO SLAVE DEVICES

(71) Applicant: Telefonaktiebolaget LM Ericsson (publ), Stockholm (SE)

(72) Inventors: Per Skillermark, Årsta (SE); Pontus Arvidson, Danderyd (SE); Bo Hagerman, Tyresö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/553,457

(22) PCT Filed: Mar. 10, 2015

(86) PCT No.: PCT/SE2015/050262
§ 371 (c)(1),
(2) Date: Aug. 24, 2017

(87) PCT Pub. No.: WO2016/144219
PCT Pub. Date: Sep. 15, 2016

(65) Prior Publication Data
US 2018/0049199 A1   Feb. 15, 2018

(51) Int. Cl.
*H04W 72/04* (2009.01)
*H04W 4/80* (2018.01)
(Continued)

(52) U.S. Cl.
CPC ......... *H04W 72/0453* (2013.01); *H04W 4/80* (2018.02); *H04L 29/06843* (2013.01);
(Continued)

(58) Field of Classification Search
CPC .......... H04W 72/0463; H04W 72/121; H04W 4/008; H04W 4/04; H04W 84/20; H04L 27/10; H04L 27/144; H04L 29/06734; H04L 29/06843; H04L 29/08324; H04L 29/08387; H04L 5/003; H04L 5/0039; H04L 5/0041; H04L 5/04; H04L 63/104; H04L 65/1066; H04L 65/4038; H04L 67/1044; H04L 67/1059; H04L 2025/03522
See application file for complete search history.

(56) References Cited

U.S. PATENT DOCUMENTS 6,480,505 B1 * 11/2002 Johansson ........... H04W 72/121
370/329
2003/0021257 A1 * 1/2003 Sato .................... H04W 72/121
370/347
(Continued)

FOREIGN PATENT DOCUMENTS

EP    1717997 A1   11/2006
EP    1732273 A1   12/2006
WO    9914897 A2    3/1999

OTHER PUBLICATIONS

Supplementary European Search Report for European Patent Application No. 15884808.5, dated Feb. 7, 2018, 4 pages.
(Continued)

*Primary Examiner* — Warner Wong
(74) *Attorney, Agent, or Firm* — Withrow & Terranova, PLLC

(57) ABSTRACT

A method performed by a master node, for handling Bluetooth connections to slave devices is provided. The master node allocates to a first group, a first set of channels, and to a second group a second set of channels. The first set of channels relates to a first part of a frequency band supported by the master node, and the second set of channels relates to a second part of the frequency band that is different from the first part of the frequency band. The master node assigns to the first group, a first connection between the master node and a first slave device, to use channels comprised in the first set of channels. The master node then attenuates for the connection in the first group, signals relating to any other group being allocated a set of channels, including the second group.

20 Claims, 11 Drawing Sheets

(51) Int. Cl.
  *H04L 29/06*  (2006.01)
  *H04W 72/12*  (2009.01)
  *H04L 29/08*  (2006.01)
  *H04W 16/14*  (2009.01)
  *H04W 84/20*  (2009.01)

(52) U.S. Cl.
  CPC .... *H04L 29/08387* (2013.01); *H04L 65/1066* (2013.01); *H04W 16/14* (2013.01); *H04W 72/121* (2013.01); *H04W 84/20* (2013.01)

(56) References Cited

U.S. PATENT DOCUMENTS

| | | |
|---|---|---|
| 2004/0136350 A1 | 7/2004 | Warmers |
| 2005/0003865 A1 | 1/2005 | Lastinger et al. |
| 2010/0173586 A1 | 7/2010 | McHenry et al. |
| 2012/0155401 A1* | 6/2012 | Shapira ................ H04W 4/08 370/329 |
| 2012/0307749 A1 | 12/2012 | Banister et al. |
| 2014/0016578 A1 | 1/2014 | Lee et al. |
| 2014/0161054 A1* | 6/2014 | Sandberg ............. H04B 7/024 370/329 |
| 2016/0112073 A1* | 4/2016 | Lum .................. H04B 1/0057 370/297 |

OTHER PUBLICATIONS

International Search Report and Written Opinion for International Patent Application No. PCT/SE2015/050262, dated Dec. 4, 2015, 11 pages.
Examination Report for European Patent Application No. 15884808.5, dated Mar. 9, 2018, 5 pages.

* cited by examiner

MASTER NODE AND A METHOD THEREIN FOR HANDLING CONNECTIONS TO SLAVE DEVICES

This application is a 35 U.S.C. § 371 national phase filing of International Application No. PCT/SE2015/050262, filed Mar. 10, 2015, the disclosure of which is incorporated herein by reference in its entirety.

TECHNICAL FIELD

Embodiments herein relate to a master node and a method therein. In particular, it relates to handling connections to slave devices.

BACKGROUND

Bluetooth low energy is a low-energy, low-cost radio communication technology that can be used, e.g., to collect information from sensors in an area. One possible setup is to have one Bluetooth low energy central device collecting information from several peripheral devices. In such a case the central device acts as a master and is connected with several peripheral devices which, once in a connection with the central device, act as slaves. To support a large number of peripheral devices it is in many cases advantageous if the master can maintain several simultaneous connections, each connection being associated with a different peripheral device.

The Industrial, Scientific and Medical (ISM) radio bands are radio bands reserved internationally for the use of Radio Frequency (RF) energy for industrial, scientific and medical purposes.

In recent years the fastest-growing uses of these bands have been for short-range, low power communications systems. Bluetooth devices use frequencies allocated to ISM, although this low power emitter is not considered ISM.

Bluetooth low energy is defined to operate in the 2.4 GHz ISM band, and uses approximately 80 MHz of the spectrum. In Bluetooth low energy there are 40 channels of 1 MHz; the channels being separated by 2 MHz. Out of these 40 channels, three are advertising channels, link layer channels 37, 38, and 39, used, e.g., to initiate a connection between a master node and a slave device, and 37 are data channels, link layer channels 0-36, used for payload exchange between the master node and the slave device. FIG. 1 depicts the Bluetooth low energy channel map with the respective link layer channel numbers. The first physical channel, which corresponds to the link layer channel 37, resides at a frequency of 2402 MHz, whereas the last physical channel, i.e., link layer channel 39, resides at 2480 MHz. A Bluetooth Low Energy (BLE) physical channel has a bandwidth of 1 MHz and uses GFSK modulation.

A connection in Bluetooth low energy is made up of connection events, which recur with a periodicity that is defined during the connection setup. The time in between two consecutive connection events is referred to as the Connection Interval (CI). Different connections may be configured using dissimilar parameters, e.g., using different connection intervals. A connection event is initiated by a packet transmission from master node to slave device and may comprise an arbitrary number of packet transmissions from the master node to the slave device and from slave device to master node. Furthermore, at each new connection event the channel number used for the packet transmissions is updated based on a frequency hopping algorithm. Frequency hopping is to change centre frequency for the carrier frequency of the transmitted signal at each hop interval over a bandwidth larger than required for the individual narrowband transmission. The frequency hopping is needed for two reasons, for regulatory purposes it allows the Bluetooth system to not implement a "listen-before-talk" scheme by periodically switching transmission frequency, and for performance purposes it gives some gains through frequency diversity as well as protection towards narrowband interference. FIG. 2 illustrates a situation in which a single master node communicates with two slave devices and how the connection events of the different connections are distributed in time. In the example in FIG. 2, the connection interval of connection 2 ($CI_2$) is double compared to the connection interval of connection 1 ($CI_1$). Furthermore, as illustrated in FIG. 2, time interleaving is used to separate connection events of different connections in time. The time interleaving is a means for the master node to distribute the connection events, related to different connected slave devices, in time.

FIG. 2 illustrates a schematic picture of two connections, $CI_1$ and $CI_2$ with their respective connection events, associated with the same master node but with different slave devices.

The channel usage of a data connection is defined by a frequency hopping algorithm. If some channels are considered as poor, e.g., due to high interference, it is possible for the master to mark these channels as poor; inform the slave about this and thereafter these channels are avoided by the frequency hopping algorithm. Bluetooth low adaptive frequency hopping technique was introduced to avoid interference, e.g., from other radio technologies such as WiFi that co-exist with Bluetooth in the 2.4 GHz band. FIG. 3 illustrates an example of frequency hopping in which the two connections referred to above are configured to avoid the link layer channel 24-32, which roughly corresponds to the WiFi channel 11. Every event on the time axis in FIG. 3 corresponds to a connection event.

FIG. 3 illustrates an example of adaptive frequency hopping.

To target an extension in coverage, i.e. longer distance and range, a simple principle is to trade data rate with range. When the data rate is reduced, the length of each connection event increases, provided that a fixed number of bits should be transmitted during the connection event, and hence fewer connection events can be supported. In addition, with an extended communication range a single central device such as a master node can reach out to a larger number of peripheral devices. Accordingly, for a longer range targeting system it becomes even more important that a large number of simultaneous connections are supported by the master node.

SUMMARY

It is therefore an object of embodiments herein to improve the performance in a Bluetooth communications system According to a first aspect of embodiments herein, the object is achieved by a method performed by a master node, for handling connections to slave devices. The connections are Bluetooth connections. The master node and slave devices operate in a Bluetooth communication system. The master node allocates to a first group, a first set of channels, and to a second group a second set of channels.

The first set of channels relates to a first part of a frequency band supported by the master node, and the second set of channels relates to a second part of the frequency band that is different from the first part of the frequency band.

The master node assigns to the first group, a first connection between the master node and a first slave device, to use channels comprised in the first set of channels.

The master node then attenuates for the connection in the first group, signals relating to any other group being allocated a set of channels, including the second group.

According to a second aspect of embodiments herein, the object is achieved by a master node for handling connections to slave devices, which connection is adapted to be a Bluetooth connection, and which master node and slave devices are adapted to operate in a Bluetooth communication system, the master node being configured to:

allocate to a first group, a first set of channels, and to a second group, a second set of channels, which first set of channels relates to a first part of a frequency band supported by the master node, and which second set of channels relates to a second part of the frequency band that is different from the first part of the frequency band, and assign to the first group, a first connection between the master node and a first slave device, to use channels comprised in the first set of channels.

The master node comprises a first filter configured to attenuate for the connections in the first group, signals relating to any other group being allocated a set of channels, including the second group.

By introducing different groups of connections such as the first group and the second group, with independent sets of channels, the number of simultaneous connections supported by a Bluetooth master node is increased. Increasing the number of simultaneous connections supported by the central master node will in turn lead to improved performance, e.g., seen as a reduction in latency of the packet transmissions, an improved energy performance of the peripheral devices, as well as an increased capacity of the Bluetooth communication system.

An advantage with embodiments herein is that the master node can use different connection parameters for different groups, thus the flexibility of adapting connection parameters to application characteristics is increased.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and shortly discussed.

For BLE it is essential that the peripheral devices such as the sensors have a low complexity, low cost and long battery lifetime. For the master node, however, a higher complexity and cost may be acceptable if it comes with an improved performance. Similarly, in the master node the energy performance is less critical as it may often be powered by a high capacity battery or connected to the power grid. Note that in this document master node and central device are used interchangeably, and further, the terms slave device and peripheral device are also used interchangeably.

Time separation which is used to isolate connection events of different connections imposes a limit on the number of simultaneous connections supported by the master node. The actual limit depends on factors like the connection interval of the different connections, as well as how much time that must be devoted to the different connection events. Practical devices that today are commercially available typically support up to eight simultaneous connections when acting as a master node. In general, the number of simultaneous connections that can be supported by using time separation only, is relatively low and may not always be sufficient for scenarios in which a master node should support a large number of peripheral devices.

Figure 1:
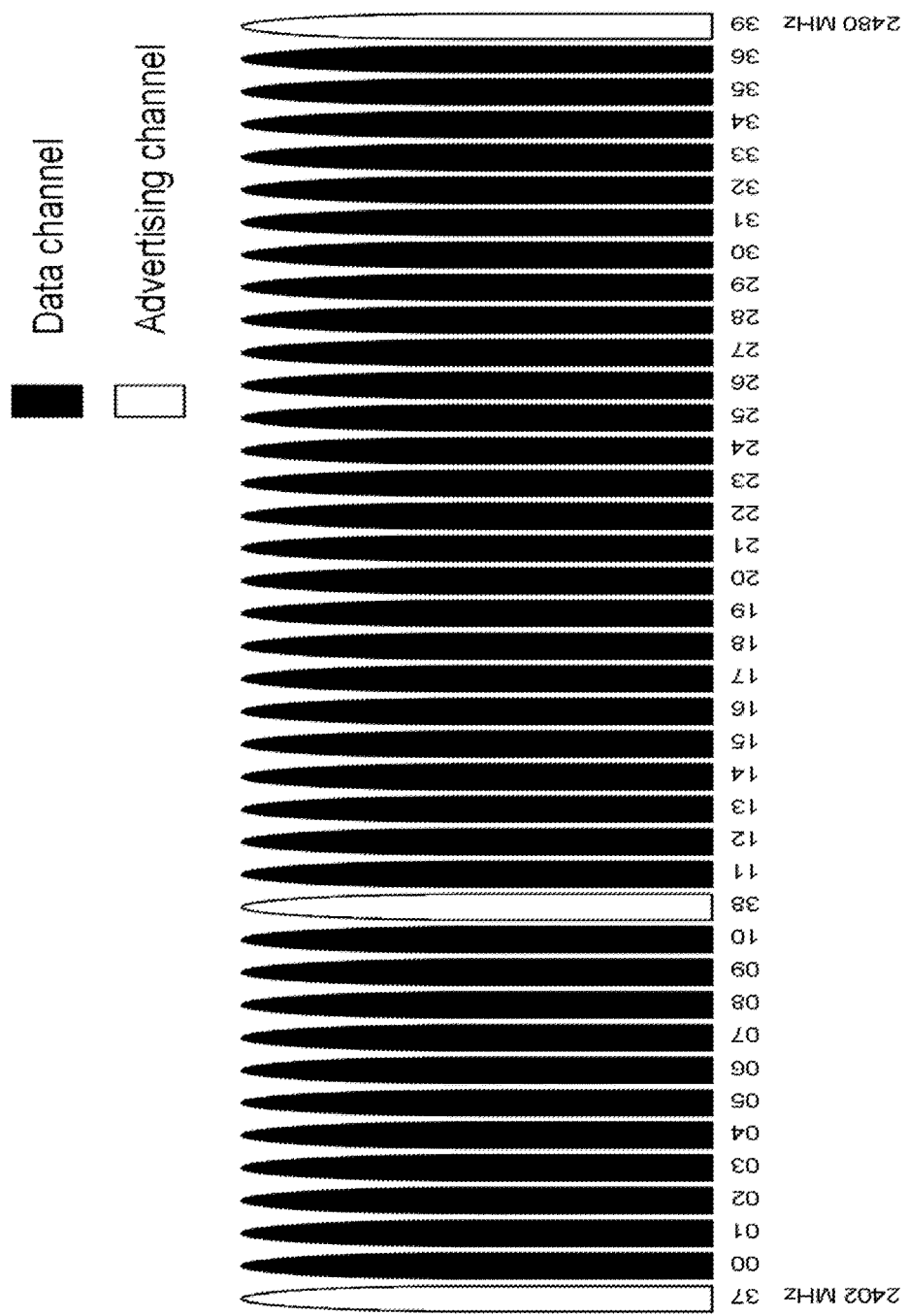
FIG. 1 is a schematic diagram illustrating prior art.
Figure 2:
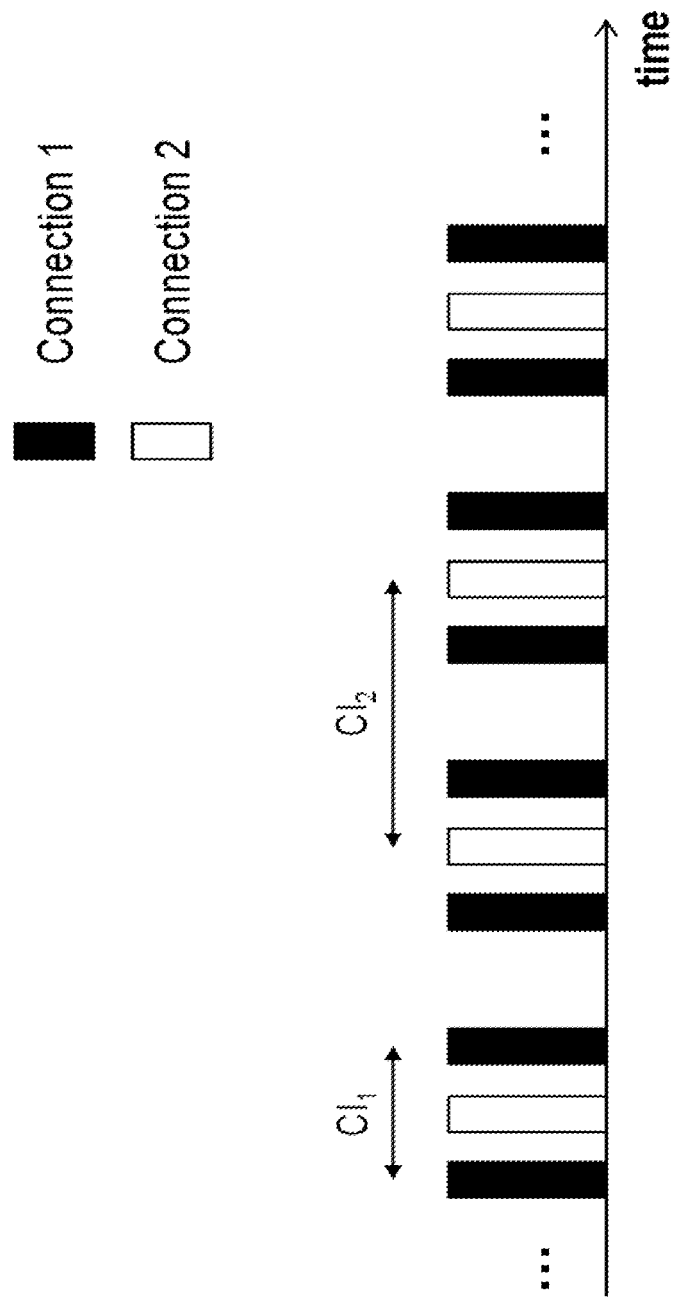
FIG. 2 is a schematic diagram illustrating prior art.
Figure 3:
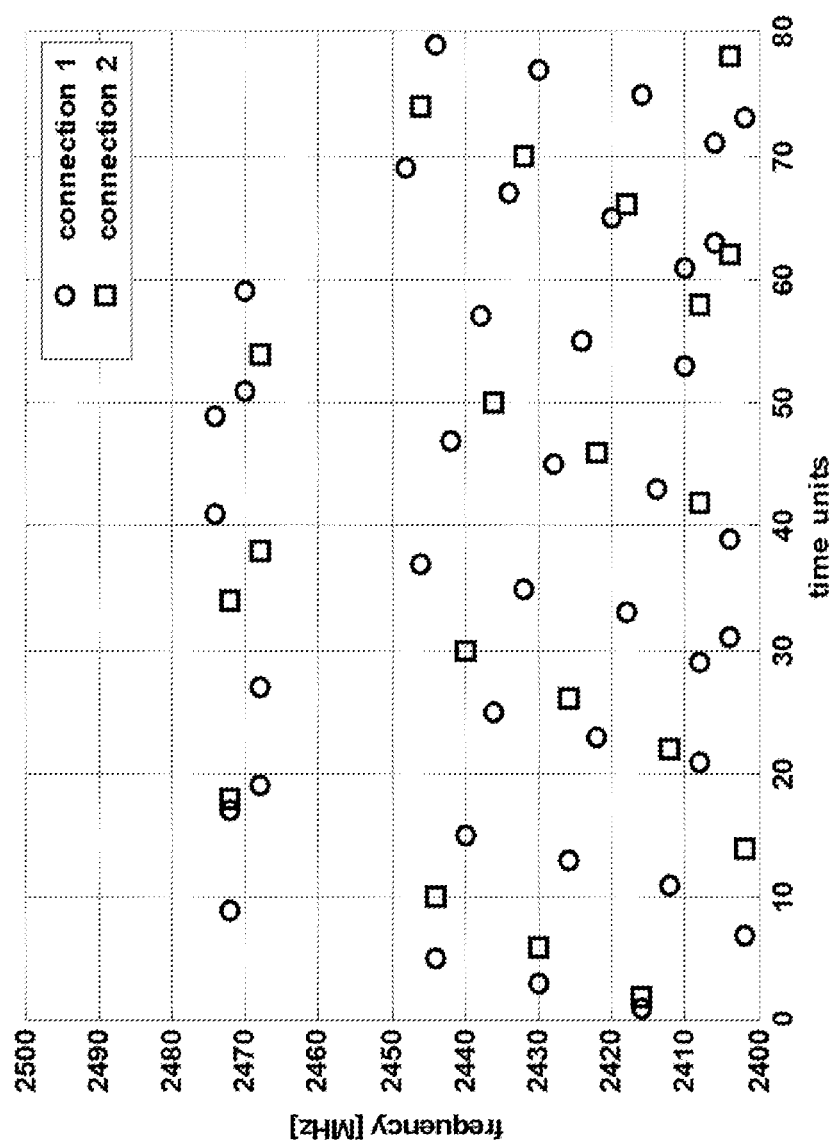
FIG. 3 is a schematic diagram illustrating prior art.
Figure 4:
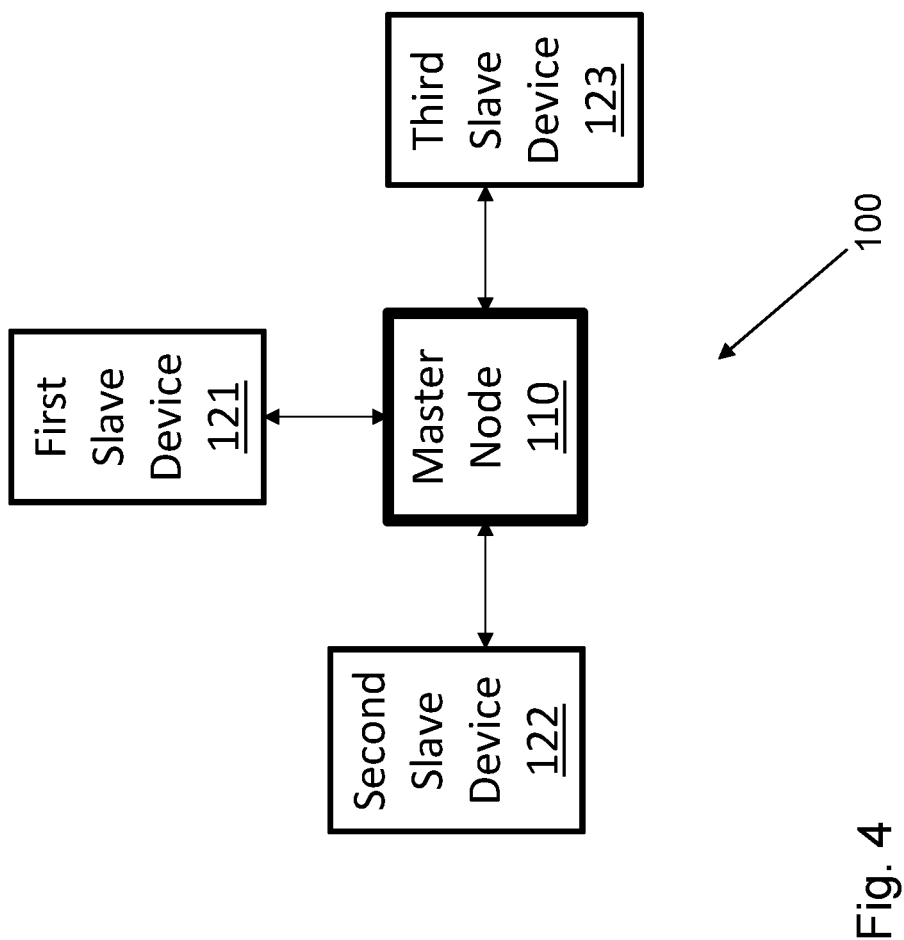
FIG. 4 is a schematic block diagram illustrating embodiments herein.

FIG. 4 depicts a Bluetooth communications system 100 in which embodiments herein may be implemented. The Bluetooth communications system 100 may e.g. be a BLE long range? (LR) system, with capacity to support communication over distances of up to 1000 m, or a BLE communications system, defined to operate in the 2.4 GHz ISM band.

Master nodes operate in the Bluetooth communications system 100, whereof one, a master node 110 is shown in FIG. 4. The master node 110 may be referred to as a master, a central device, a central master node, which may be a high capacity Bluetooth central device, a smart phone, a tablet, a laptop or a fixed access point. The master node 110 handles Bluetooth connections to slave devices in Bluetooth radio coverage of the master node 110. The master node 110 may e.g. be used to collect information from sensors in the Bluetooth radio coverage area of the master node 110.

One or more slave devices operate in the Bluetooth communications system 100, whereof a first slave device 121, a second slave device 122, and a third slave device 123, are shown in FIG. 4. The first, second and third slave devices 121, 122, 123 may be referred to as slaves, peripheral devices, which may e.g. be low power sensors or actuators or mobile wireless terminals, mobile phones, computers such as e.g. laptops, or tablet computers, with Bluetooth capabilities, or any other units capable to communicate with a master node in the Bluetooth communications system 100. The first, second and third slave devices 121, 122, 123 are located in Bluetooth radio coverage of the master node 110. This means that the first, second and third slave devices 121, 122, 123 are capable to communicate with the master node 110 using Bluetooth technology.

In one example scenario, a Bluetooth low energy central device such as e.g. the master node 110 collects information from several peripheral devices such as the first, second and third slave devices 121, 122, 123.

Embodiments herein provide a high capacity Bluetooth central device such as the master node 110 which has the capacity to handle a large number of simultaneous connections with peripheral devices such as the slave devices 121, 122, and 123.

Embodiments herein e.g. provide a systematic usage of the frequency band to increase the number of simultaneous connections supported by the master node 110. No standard changes are needed and the method is fully transparent to the peripheral devices such as the first, second and third slave devices 121, 122, 123.

Users such as the first, second and third slave devices 121, 122, 123 are divided into multiple groups of connections and a certain set of channels also referred to as physical channels is assigned to each group for data communication. The connection handling within a group is administered and coordinated just as in the prior art, whereas connections that belong to different groups are handled independently. Moreover, according to embodiments herein, the master node 110 is equipped with hardware including filters designed to match the channel usage of each respective group, such that signals on channels that belong to the group passes the filter whereas signals that belong to channels that are not part of the group are highly attenuated.

The term "group" and "group of connections" may be used interchangeably herein.

Figure 5:
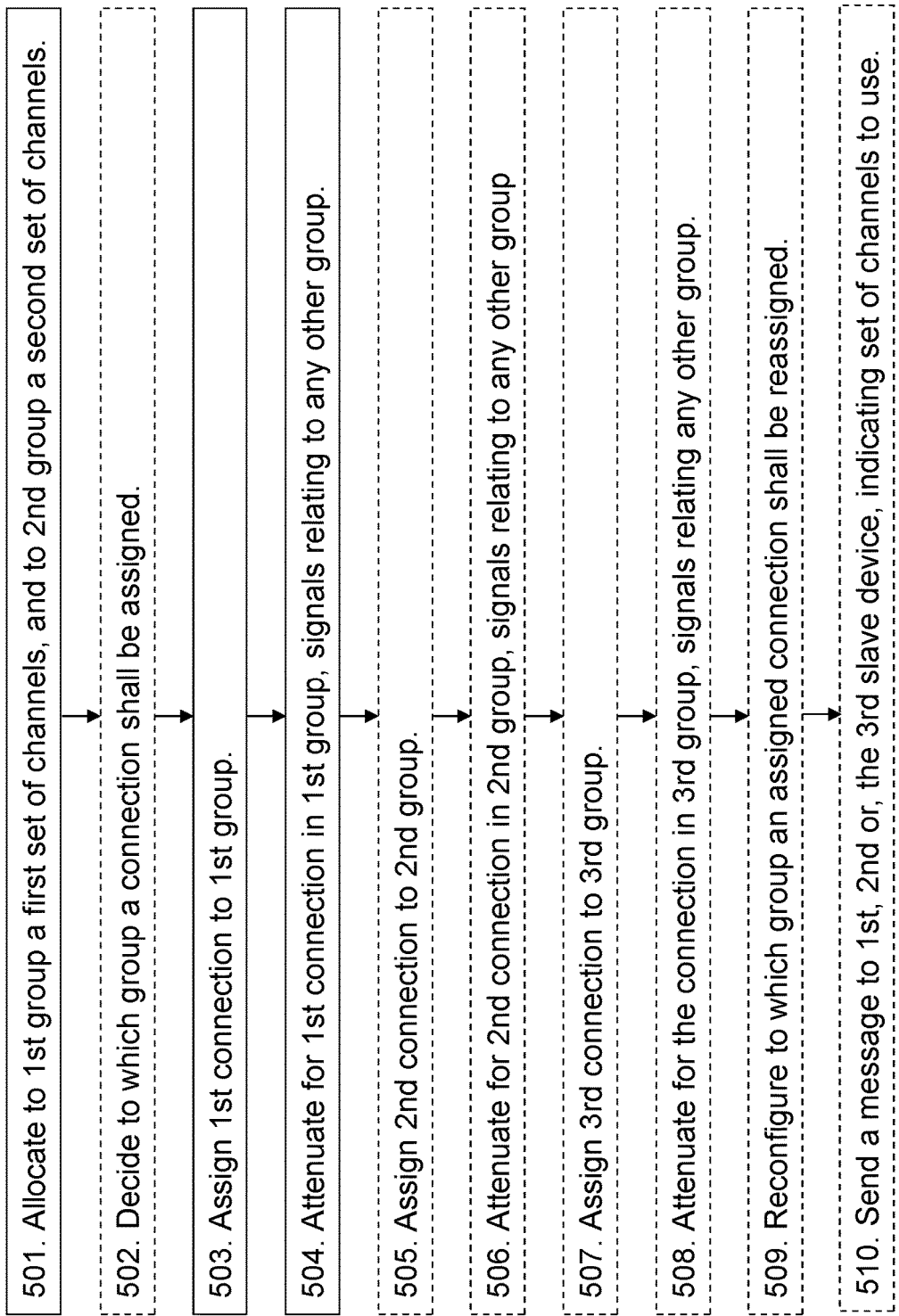
FIG. 5 is a flowchart depicting embodiments of a method in a master node.

Example embodiments of a method performed by the master node 110 for handling connections to slave devices, will now be described with reference to a flowchart depicted in FIG. 5. As mentioned above, the connections are Bluetooth connections. The master node 110 and the slave devices operate in the Bluetooth communication system 100.

The method comprises the following actions, which actions may be taken in any suitable order. Dashed lines of one box in FIG. 5 indicate that this action is not mandatory.

Action 501

In an example scenario, the master node 110 is configured with two or more groups where each of the group is allocated a set of channels. For example, for regulatory reasons each group needs at least two channels to perform frequency hopping. Thus the maximum number of groups is equal to half the number of available data channels. For BLE this is 18, (floor (37/2)).

Thus the master node 110 allocates to a first group, a first set of channels, and to a second group a second set of channels.

The first set of channels relates to a first part of a frequency band supported by the master node 110. The second set of channels relates to a second part of the frequency band that is different from the first part of the frequency band.

In some embodiments, this action further comprises that the master node 110 allocates to one or more third groups a respective third set of channels. Each respective third set of channels relates to a respective third part of the frequency band that is different from each other and different from the first part and the second part of the frequency band.

Action 502

In an example scenario, a new connection is to be set up between the master node 110 and the slave device 121. The master node 110 need to know which group out of the two or more groups the new connection shall be assigned. The master node 110 may then decide to which group a connection shall be assigned. The decision relating to which group of a connection shall be assigned may be based on any one or more out of:

the number of already existing connections in each of the groups;

the expected throughput of the connection, the profile of the connection, the quality of the channels in the respective groups the received power of the connecting slave device 121, 122, 123.

This action may also be performed in other example scenario, for each other new connections to be set up e.g. between the master node 110 and the second slave device 122 and between the master node 110 and one or more third slave devices 123.

The Actions 503 and 504 below relates to a scenario wherein a connection is assigned to the first group.

Action 503

In an example scenario, a new connection between the master node 110 and the first slave device 121, is to be assigned to the first group. The new connection is in this example referred to as the first connection. The master node 110 assigns to the first group, the first connection between the master node 110 and a first slave device 121, to use channels comprised in the first set of channels.

The master node 110 may also assign to the first group, other connections between the master node 110 and other slave devices, to use channels comprised in the first set of channels. This means that multiple connections to slave devices can be handled at the same time in the first group.

Action 504

The master node 110 is equipped with filters designed to match the channel usage of each respective group, such that signals on channels that belong to the group passes the filter whereas signals that belong to channels that are not part of the group are highly attenuated. In this example scenario wherein the first connection is assigned to the first group, signals relating to other groups than the first group need to be attenuated. Thus, the master node 110 attenuates for the first connection in the first group, and any other connection assigned to the first group, signals relating to any other group being allocated a set of channels, including the second group.

The Actions 505 and 506 below relates to a scenario wherein a second connection is assigned to the second group.

Action 505

In an example scenario, another new connection between the master node 110 and the second slave device 122, has been decided to be assigned to the second group. The new connection is in this example referred to as the second connection. The master node 110 may then assigns to the second group, the second connection between the master node 110 and the second slave device 122, to use channels comprised in the second set of channels.

The master node 110 may also assign to the second group, other connections between the master node 110 and other slave devices, to use channels comprised in the second set of channels. This means that multiple connections to slave devices can be handled at the same time also in the second group.

Action 506

In this example scenario wherein the second connection is assigned to the second group, signals relating to other groups than the second group need to be attenuated. This means that in embodiments wherein Action 505 has been performed, the master node 110 attenuates for the second connection in the second group, and any other connection assigned to the second group, signals relating to any other group being allocated a set of channels, including the first group.

The Actions 507 and 508 below relates to a scenario wherein a connection further is assigned to one or more third group.

Action 507

In an example scenario, yet another new connection between the master node 110 and the third slave device 123, has been decided to be assigned to the third group. The new connection is in this example referred to as the third connection. In some embodiments, the master node 110 assigns a third connection between the master node 110 and the third slave device 122, to use channels comprised in one particular third set of channels related to one particular third group out of the one or more third groups.

Action 508

In this example scenario wherein the third connection is assigned to the particular third group, signals relating to other groups than the particular third group need to be attenuated. In the embodiments wherein Action 507 has been performed, the master node 110 attenuates for the connection in the particular third group, and any other connection assigned to the particular third group, signals relating to any other group being allocated a set of channels, including any one or more out of:

the first group,
the second group, and
any of the one or more third groups apart from the particular third group.

In this way connections assigned to three or more groups may be handled simultaneously. This means that multiple connections may be handled at the same time in each of the first, second and third group.

Action 509

A property in the environment may change during an ongoing connection. The master node 110 may dynamically reconfigure the group assignment during run-time. For example, if many of the connections in the first group are terminated the master node 110 may choose to move some of the connections in the second group to the first group in order to balance the number of connections per group. Similarly, for a connection that experiences poor quality on many of the channels used by a group it may be advantageous to switch to another group. Therefore, in some embodiments, the master node 110 reconfigures to which group an assigned connection shall be reassigned based on any one or more out of the number of already existing connections in each of the groups;
the expected throughput of the connection,
the profile of the connection,
the quality of the channels in the respective groups
the received power of the connecting slave device 121, 122, 123.

The set of cannels not to use may be referred to as bad channels or poor channels when informing the first, second and/or third slave devices 121, 122, 123. In practice this may be performed by marking, in a connection configuration message according to Bluetooth Link Layer protocol, as an illustrating example, marking the channels 16-37 and 0-21 as poor to the first group, such as group A and to the second group such as group B, respectively. This reconfiguration should preferably be identical to the initial group assignment.

Action 510

The master node 110 may then send a message to any of the first slave device 121, the second slave device 122, the third slave device 123, which message indicates which set of channels to use and which set of cannels not to use.

The channels comprised in any of the respective first set of channels, second set of channels and one or more third set of channels may be consecutive channels. This is due to the characteristics of the filters.

By using the method described above the number of simultaneous connections to slave devices supported by the master node 110 is increased. The capacity is increased as the different groups can be scheduled in time completely independent of one another. Increasing the number of simultaneous connections supported by the master node 110 will in turn lead to improved performance, e.g., seen as a reduction in latency of packet transmissions between the master node 110 and the first, second and third slave devices 121, 122, 123, an improved energy performance of the peripheral devices such as the first, second and third slave devices 121, 122, 123, as well as an increased capacity of the Bluetooth communication system 100. Embodiments herein may be implemented without standard changes and is fully transparent to the peripheral devices such as the first, second and third slave devices 121, 122, 123.

Embodiment's herein will now be further described and explained. The text below is applicable to and may be combined with any suitable embodiment described above.

Master Node 110 Designed for Two Connection Groups

A particular implementation is to design the master node 110 to handle two groups of connections, the first group and the second group, also referred to as group A and group B herein. The channel usage of the two groups may, e.g., be created by allocating link layer channels 0-15 to the first group, group A, and the link layer channels 22-37 to the second group, group B. In some embodiments as mentioned in Action 510, the master node 110 sends a message to any of the first slave device 121, the second slave device 122, and the third slave device 123. The message indicates which set of channels to use and which set of cannels not to use. The set of cannels not to use may be referred to as bad channels or poor channels when informing the first, second and/or third slave devices 121, 122, 123. In practice this may be performed by marking, in a connection configuration message, the channels 16-37 and 0-21 as poor for the first group, group A and the second group, group B, respectively. Note that in this example the link layer channels 16-21 are unused.

Figure 6:
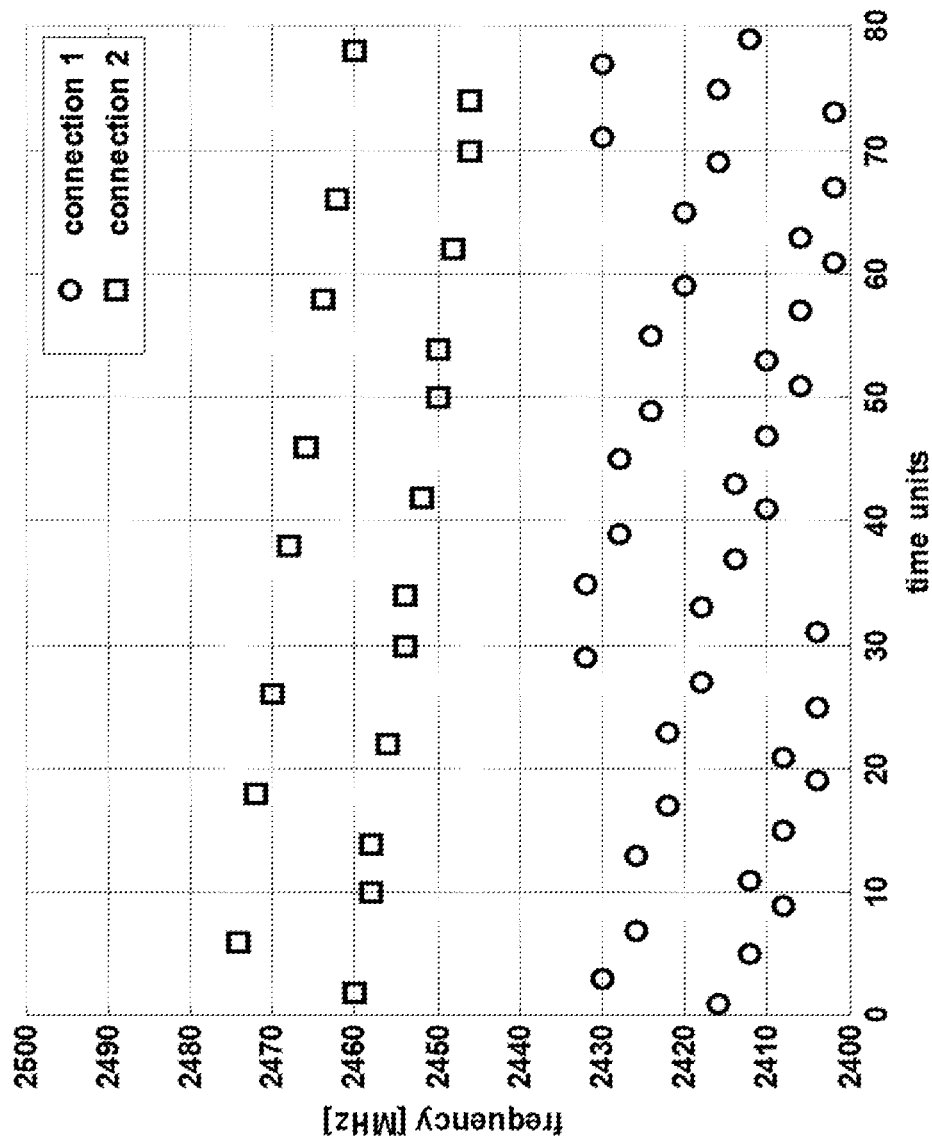
FIG. 6 is a schematic diagram illustrating embodiments herein.

Once a new connection shall be created, the master node 110 will assign the new connection to either the first group, group A or the second group, group B and then configure the connection according to the channel usage of this group. The group assignment may, e.g., be based on the number of already existing connections in each of the groups; assigning the new connection to the group that hosts the lesser number of connections. Moreover, FIG. 6 provides an example of a frequency hopping pattern of two connections belonging to different groups, in which the first connection belongs to the first group, group A and the second connection belongs to the second group, group B. In this example, the first connection hops in the range 2402-2432 MHz and the second connection hops in the range 2446-2474 MHz.

To handle two connection groups in which the transmission and reception events are uncoordinated across the groups the master node 110 may e.g. be designed according to one of the following two options:

Option 1: Dual Antenna in Master Node 110

With this design the master node 110 is equipped with dual antennas, each antenna handling the transmission and reception of one of the groups, a first antenna 171 for the first group and a second antenna 172 for the second group. The design principle according to this option is illustrated in FIG.

Figure 7:
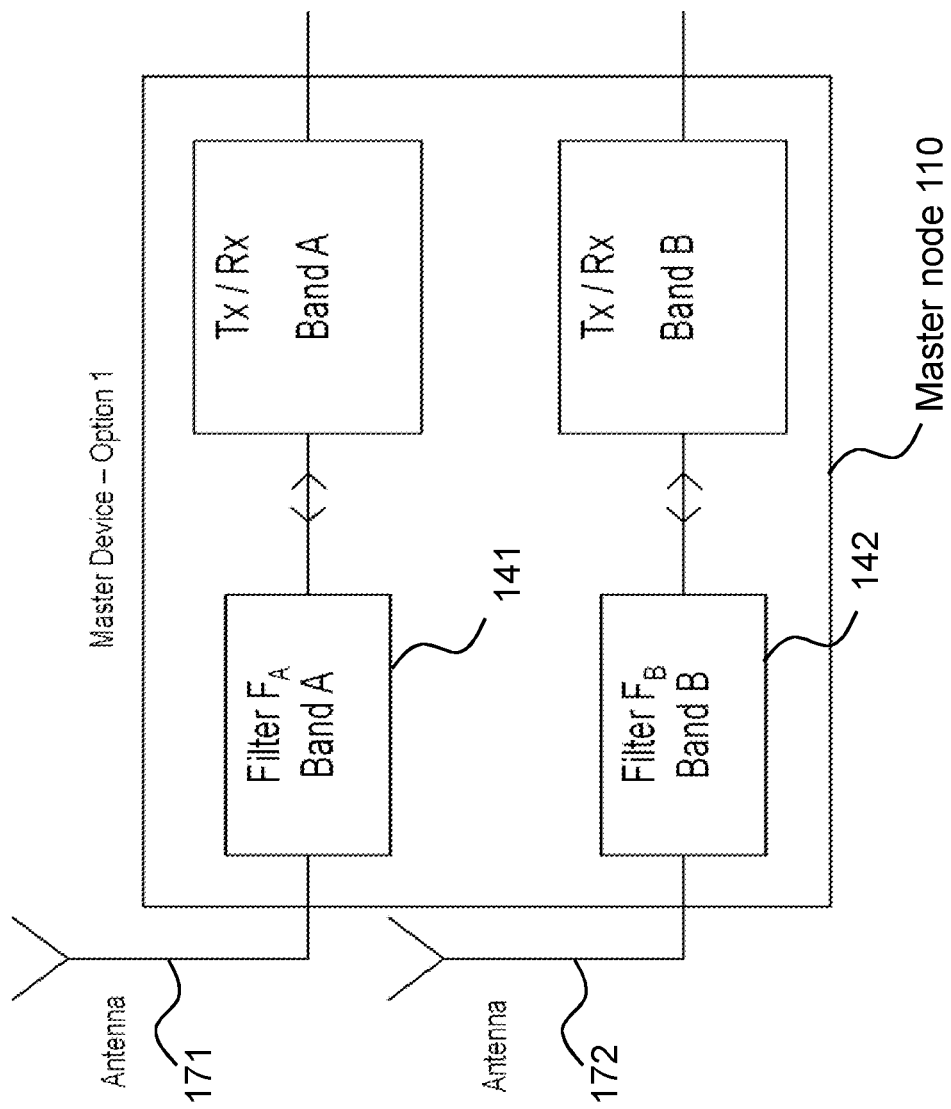
FIG. 7 is a schematic block diagram illustrating embodiments of a master node.

7 depicting dual antenna master node design capable of handling two groups. Connected to each antenna there is a filter designed to match the channel usage of the group. i.e., channels associated with the group passes the filter whereas other channels and other frequencies in general are highly attenuated. FIG. 7 illustrates a specific embodiment of filter design, in which a first filter 141, also referred to as filter $F_A$ is associated with the first group, group A. Further, a second filter, also referred to as Filter $F_B$ is associated with the second group, group B. The advertisement channels 37 and 38 are here handled jointly with connections in the first group and the advertisement channel 39 is handled jointly with connections in the second group.

Figure 8:
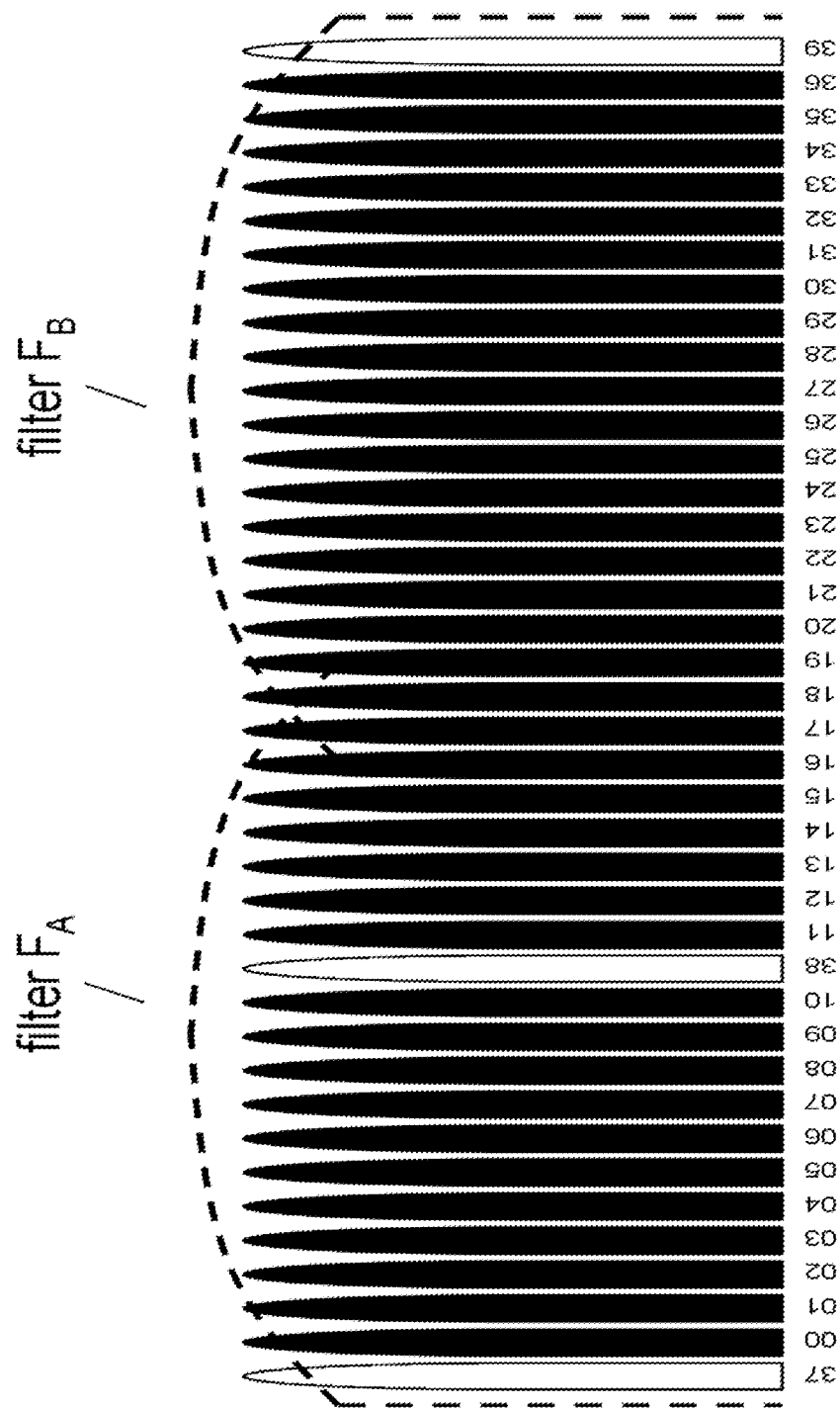
FIG. 8 is a schematic diagram illustrating embodiments herein.

Using this design option, antenna polarization may be used to improve the isolation between the different transmitter-receiver chains beyond what is offered by the filters. FIG. 8 illustrates a schematic filter design. Using antennas with orthogonal polarizations for the different transmitter-receiver chains in FIG. 8 will decrease the coupling between the channel groups and hence, it is possible to decrease the physical separation between the antennas or even co-locate the antennas.

Option 2: Single Antenna in Master Node 110 Using Diplexer

Figure 9:
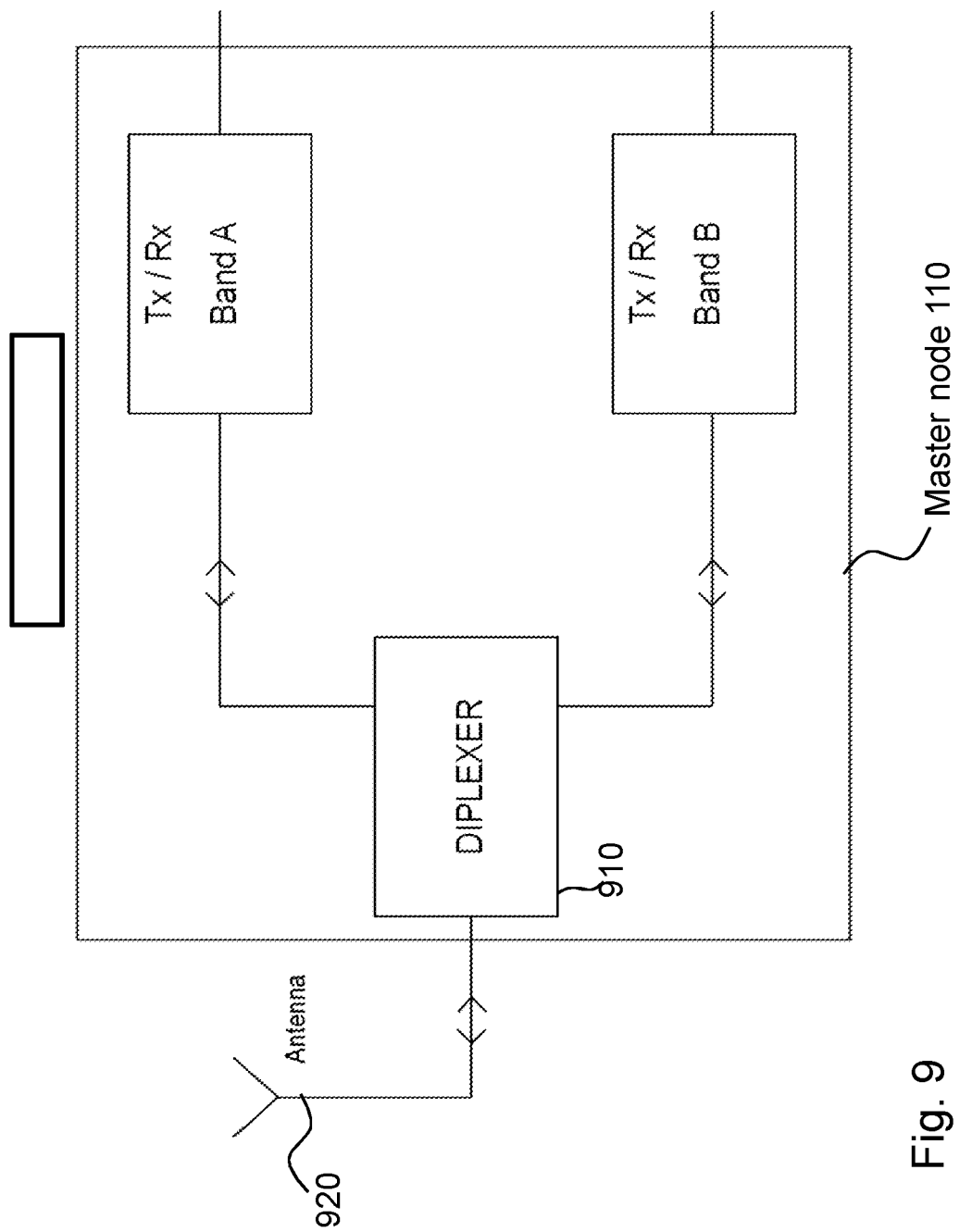
FIG. 9 is a schematic block diagram illustrating embodiments of a master node.
Figure 10:
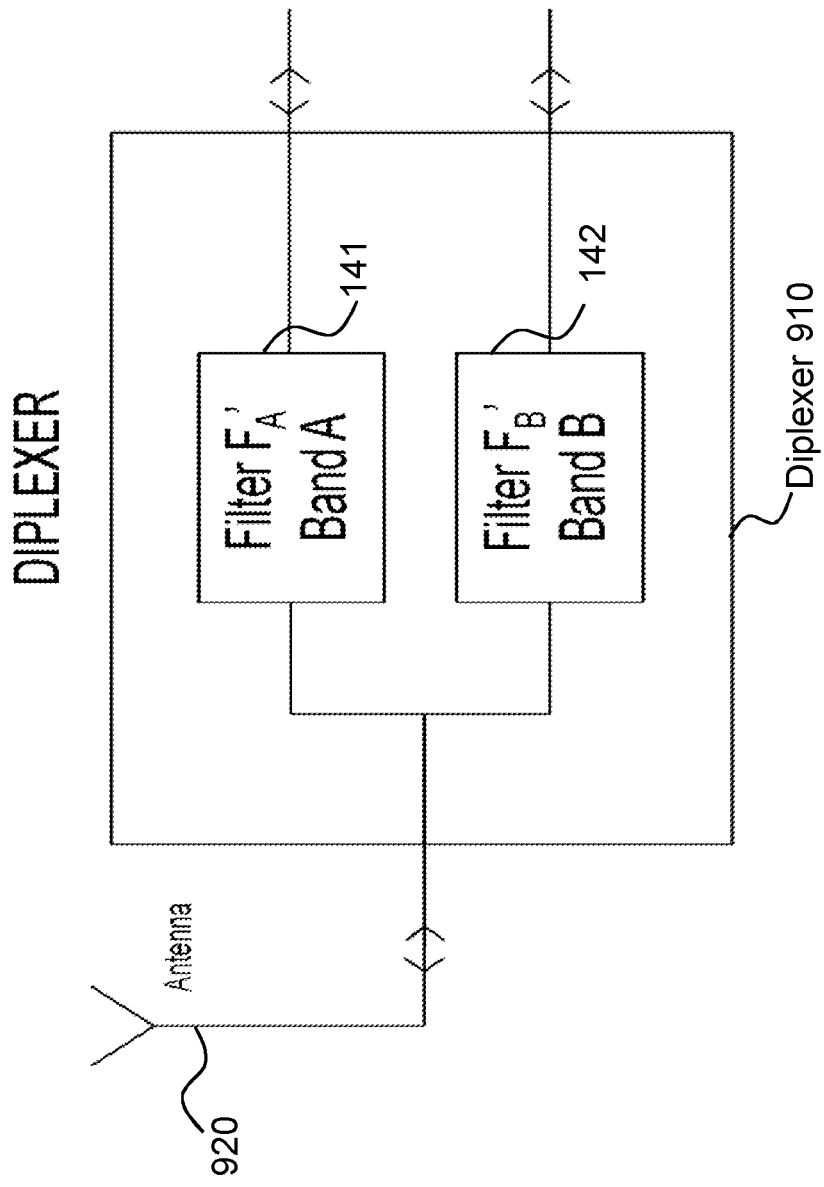
FIG. 10 is a schematic block diagram illustrating embodiments of a diplexer.

Alternatively, if a single, common, antenna design is desired a diplexer 910 connected to the single antenna 920 may be used, as illustrated in FIG. 9. The diplexer 910 depicted in FIG. 9, comprises filters similar to what is used in the dual antenna design, this means that. FIG. 10 illustrates a specific embodiment relating to a single antenna master node design capable of handling two groups such as the first group and the second group. In this embodiment, the diplexer 910 connected to the single antenna 920 comprises the first filter 141, also referred to as filter $F_A$ being associated with the first group, group A, and the second filter 142, also referred to as Filter $F_B$ being associated with the second group, group B. In this case, however, the filter design may be more challenging as it an advantage if it is capable of handling large power dynamics of simultaneous transmission and reception on the different filtered signal branches.

POSSIBLE VARIATIONS, EXTENSIONS AND ALTERNATIVE EMBODIMENTS

It is relatively straightforward to increase the number of supported groups beyond two. As mentioned above connections assigned to three or more groups may be handled simultaneously. This means that multiple connections may be handled at the same time in each of the first, second and third group. Group assignments and channel usage follows directly from the principles already described, however, the complexity of the master node 110 increases with the number of groups that shall be supported. With M groups, M transmitter-receiver chains are required and also M antennas when using a master node design following option 1. If master design option 2 is used, an M-plexer is used, instead of the diplexer used for the dual antenna case. Furthermore, if the master node 110 is to support more groups than two, it is possible to use a hybrid combination of design option 1 one and design option 2. For example, if four groups is the target two diplexers may be used, each diplexer using a separate antenna and combining the signals associated with two channel groups.

Instead of using the number of connections in each group as input to the group assignment, several alternative metrics may be used, such as for example the expected throughput of the connection or the profile of the connection. E.g., connection handling may be simplified if connections with similar expected throughput and using same or similar profiles are assigned to the same group. Alternatively, the master node 110 may try to have a balanced overall throughput in the different groups.

Yet another alternative is to base the channel group selection on the quality of the channels in the respective groups and the received power of the connection. Here, connections received with high power may be assigned to the channel groups associated with high interference and vice versa.

Figure 11:
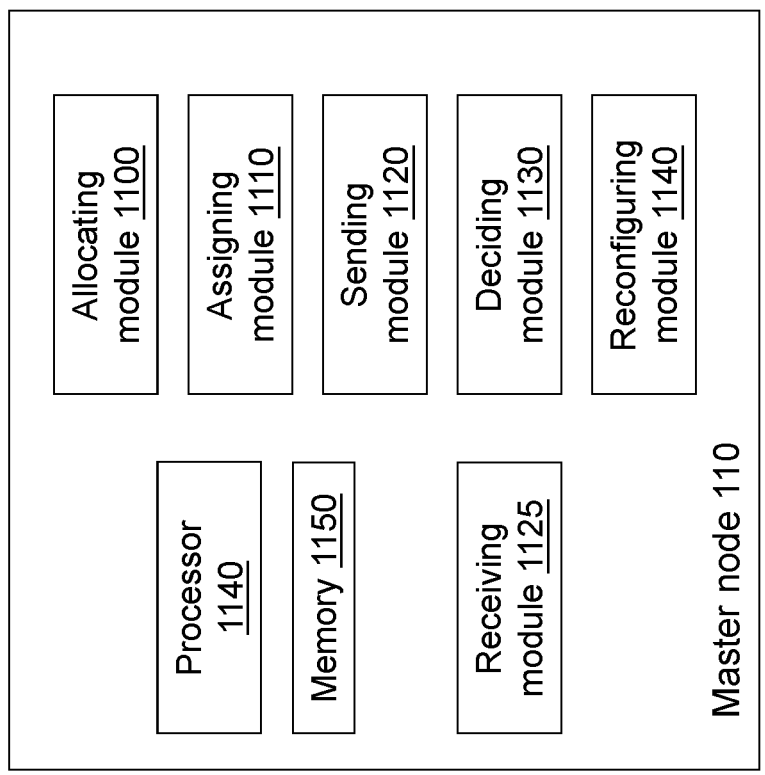
FIG. 11 is a schematic block diagram illustrating embodiments of a master node.

To perform the method actions for handling connections to slave devices described above in relation to FIG. 5, the master node 110 may comprise the following arrangement depicted in FIG. 11. As mentioned above the connection is adapted to be a Bluetooth connection, and the master node 110 and slave devices are adapted to operate in a Bluetooth communication system 100.

The master node 110 is configured to, e.g. by means of an allocating module 1100 configured to, allocate to a first group, a first set of channels, and to a second group, a second set of channels. The first set of channels relates to a first part of a frequency band supported by the master node 110, and which second set of channels relates to a second part of the frequency band that is different from the first part of the frequency band.

The master node 110 may further be configured to, e.g. by means of the allocating module 1100 configured to perform the allocating by allocate to one or more third groups a respective third set channels, in which each respective third set of channels relates to a respective third part of the frequency band that is different from each other and different from the first part and the second part of the frequency band.

The master node 110 is further configured to: e.g. by means of an assigning module 1110 configured to assign to the first group, a first connection between the master node 110 and a first slave device 121, to use channels comprised in the first set of channels.

The master node 110 may further be configured to e.g. by means of the assigning module 1110 configured to assign to the second group, a second connection between the master node 110 and a second slave device 122, to use channels comprised in the second set of channels, The master node 110 may further be configured to e.g. by means of the assigning module 1110 configured to assign a third connection between the master node 110 and a third slave device 122, to use channels comprised in one particular third set of channels related to one particular third group out of the one or more third groups, The master node 110 comprises the first filter 141 configured to attenuate for the connections in the first group, signals relating to any other group being allocated a set of channels, including the second group.

The master node 110 may further comprise the second filter 142 configured to—attenuate for the second connection in the second group, signals relating to any other group being allocated a set of channels, including the first group.

The master node 110 may further comprise a third filter 143 being configured to attenuate for the connection in the particular third group, signals relating to any other group being allocated a set of channels, including any one or more out of:
  the first group,
  the second group, and
  any of the one or more third groups apart from the particular third group.

The master node 110 may further be configured to, e.g. by means of a sending module 1120 configured to send a message to any of the first slave device 121, the second slave device 122, the third slave device 123, which message indicates which set of channels to use and which set of cannels not to use.

The master node 110 may further comprise a receiving module 1125 configured to receive signals and data.

The channels comprised in any of the respective first set of channels, second set of channels and one or more third set of channels may be consecutive channels.

The master node 110 may further be configured to, e.g. by means of a deciding module 1130 configured to decide to which group a connection shall be assigned.

In some embodiments, the master node 110 is configured to base the deciding to which group a connection shall be assigned, on any one or more out of:
the number of already existing connections in each of the groups;
the expected throughput of the connection,
the profile of the connection,
the quality of the channels in the respective groups
the received power of the connecting slave device 121, 122, 123.

The master node 110 may further be configured to, e.g. by means of a reconfiguring module 1140 configured to reconfigure to which group an assigned connection shall be reassigned is based on any one or more out of:
the number of already existing connections in each of the groups;
the expected throughput of the connection,
the profile of the connection,
the quality of the channels in the respective groups
the received power of the connecting slave device 121, 122, 123.

In some embodiments, the master node 110 comprises multiple antennas 171, 172, whereof each antenna is assigned to handle connections to one respective group out of any of the first group, the second group and the one or more third groups.

Each antenna out of the multiple antennas, may be connected to one filter out of: the first filter 141, the second filter 142 and one or more third filters 143

In some embodiments, the master node 110 comprises the single antenna 910 comprising a diplexer 920, which diplexer 920, comprises the first filter 141 and the second filter 142.

In some embodiments, the master node 110 comprises the single antenna 910 comprising an M-plexer, which M-plexer, comprises the first filter 141, the second filter 142, and one or more third filters.

The embodiments herein comprising the process of for handling connections to slave devices, may be implemented through one or more processors, such as a processor 1150 in the master node 110 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the master node 110. One such carrier may be in the form of a CD ROM disc. It is however feasible with other data carriers such as a memory stick. The computer program code may furthermore be provided as pure program code on a server and downloaded to the master node 110.

The wireless device 120 may further comprise the memory 1160 comprising one or more memory units. The memory 1160 comprises instructions executable by the processor 1150.

The memory 1160 is arranged to be used to store e.g. the set of channels allocated to the different groups, data, configurations, and applications to perform the methods herein when being executed in the master node 110.

Those skilled in the art will also appreciate that the modules in the master node 110, described above may refer to a combination of analog and digital circuits, and/or one or more processors configured with software and/or firmware, e.g. stored in the memory 1160, that when executed by the one or more processors such as the processor 1130 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Embodiments herein may be implemented without standard changes and is fully transparent to the peripheral devices. They may be used for new deployments or to improve the performance in an already existing deployment. In the latter case the master node 110 shall be upgraded or replaced.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a master node for handling connections to slave devices, which connections are Bluetooth connections, and which master node and slave devices operate in a Bluetooth communication system, the method comprising:
allocating to a first group of slave devices a first set of channels;
allocating to a second group of slave devices a second set of channels where the first set of channels relates to a first part of a frequency band supported by the master node and the second set of channels relates to a second part of the frequency band that is different from the first part of the frequency band;
assigning to the first group a first connection, between the master node and a first slave device, to use channels comprised in the first set of channels;
attenuating, using a first filter, for the first connection in the first group, signals relating to any other group of slave devices being allocated a set of channels, including the second group;
assigning to the second group a second connection, between the master node and a second slave device, to use channels comprised in the second set of channels; and
attenuating, using a second filter, for the second connection in the second group, signals related to any other group of slave devices being allocated a set of channels, including the first group;
wherein the master node includes one or more antennas each connected to at least one of a first antenna and a second antenna.

2. The method according to claim 1,
wherein the allocating further comprises allocating to one or more third groups of slave devices a respective third set of channels, in which each respective third set of channels relates to a respective third part of the frequency band that is different from each other and different from the first part and the second part of the frequency band,
assigning a third connection, between the master node and a third slave device, to use channels comprised in one particular third set of channels related to one particular third group of slave devices out of the one or more third groups, and
attenuating, for the connection in the particular third group, signals relating to any other group of slave devices being allocated a set of channels, including one or more of the group of slave devices consisting of:
the first group;
the second group; and
any of the one or more third groups apart from the particular third group.

3. The method according to claim 1, further comprising:
sending a message to any of the first slave device, the second slave device, and a third slave device, which message indicates which set of channels to use and which set of channels not to use.

4. The method according to claim 1, wherein the channels comprised in any of the respective first set of channels, second set of channels, and one or more third set of channels are consecutive channels.

5. The method according to claim 1, further comprising:
deciding to which group a connection shall be assigned.

6. The method according to claim 5, wherein the deciding to which group a connection shall be assigned is based on one or more of the group consisting of:
a number of already existing connections in each of the groups;
an expected throughput of the connection;
a profile of the connection;
a quality of the channels in the respective groups; and
a received power of a connecting slave device.

7. The method according to claim 1, further comprising:
reconfiguring to which group an assigned connection shall be reassigned based on one or more of the group consisting of:
a number of already existing connections in each of the groups;
an expected throughput of the connection;
a profile of the connection;
a quality of the channels in the respective groups; and
a received power of a connecting slave device.

8. A master node for handling connections to slave devices, which connection is adapted to be a Bluetooth connection, and which master node and slave devices are adapted to operate in a Bluetooth communication system, the master node being configured to:
allocate to a first group of slave devices a first set of channels;
allocate to a second group of slave devices a second set of channels, where the first set of channels relates to a first part of a frequency band supported by the master node and the second set of channels relates to a second part of the frequency band that is different from the first part of the frequency band;
assign to the first group a first connection, between the master node and a first slave device, to use channels comprised in the first set of channels; and
assign to the second group a second connection, between the master node and a second slave device, to use channels comprised in the second set of channels; and
the master node comprising:
a first filter configured to attenuate, for connections in the first group, signals relating to any other group of slave devices being allocated a set of channels, including the second group;
a second filter configured to attenuate, for connections in the second group, signals related to any other group of slave devices being allocated a set of channels, including the first group; and
one or more antennas each connected to at least one of a first antenna and a second antenna.

9. The master node according to claim 8,
wherein the master node further is configured to perform the allocating by allocating to one or more third groups of slave devices a respective third set of channels, in which each respective third set of channels relates to a respective third part of the frequency band that is different from each other and different from the first part and the second part of the frequency band, and
wherein the master node further is configured to assign a third connection, between the master node and a third slave device, to use channels comprised in one particular third set of channels related to one particular third group of slave devices out of the one or more third groups,
the master node further comprising a third filter being configured to attenuate, for the connection in the particular third group, signals relating to any other group of slave devices being allocated a set of channels, including one or more of the group of slave devices consisting of:
the first group;
the second group; and
any of the one or more third groups apart from the particular third group.

10. The master node according to claim 8, wherein the master node further is configured to:
send a message to any of the first slave device, the second slave device, and a third slave device, which message indicates which set of channels to use and which set of channels not to use.

11. The master node according to claim 8, wherein the channels comprised in any of the respective first set of channels, second set of channels, and one or more third set of channels are consecutive channels.

12. The master node according to claim 8, wherein the master node further is configured to:
decide to which group of slave devices a connection shall be assigned.

13. The master node according to claim 12, wherein the master node further is configured to base the deciding to which group a connection shall be assigned on one or more of the group of slave devices consisting of:
a number of already existing connections in each of the groups of slave devices;
an expected throughput of the connection;
a profile of the connection;
a quality of the channels in the respective groups of slave devices; and
a received power of a connecting slave device.

14. The master node according to claim 8, wherein the master node further is configured to reconfigure to which group of slave devices an assigned connection shall be reassigned is based on one or more of the group of slave devices consisting of:

a number of already existing connections in each of the groups of slave devices;
an expected throughput of the connection;
a profile of the connection;
a quality of the channels in the respective groups of slave devices; and
a received power of a connecting slave device.

15. The master node according to claim 8, wherein
each antenna of the one or more antennas is assigned to handle connections to one respective group of slave devices out of any of the first group, the second group, and one or more third groups of slave devices.

16. The master node according to claim 15, wherein
each antenna out of the one or more antennas is connected to one filter out of: the first filter, the second filter, and one or more third filters.

17. The master node according to claim 8, further comprising:
a single antenna comprising a diplexer, which diplexer comprises the first filter and the second filter.

18. The master node according to claim 8, further comprising:
a single antenna comprising an M-plexer, which M-plexer comprises the first filter, the second filter, and one or more third filters.

19. The method of claim 1, wherein the one or more antennas comprise the first antenna coupled to the first filter and the second antenna coupled to the second filter such that the first antenna is assigned to handle the first connection to the first group and the second antenna is assigned to handle the second connection to the second group.

20. The method of claim 1, wherein the one or more antennas comprise a single antenna, and the first filter and the second filter are comprised in a M-plexer.

* * * * *